J. H. HILLS,
Assignor, by mesne assignments, of part interest to S. A. BOWERS, E. R. HARD, C. H. BLODGETT, D. G. REED, G. S. & J. MOULTON & G. H. BISSELL.
Car Coupling.
No. 9,727. Reissued May 31, 1881.
Fig. 1.
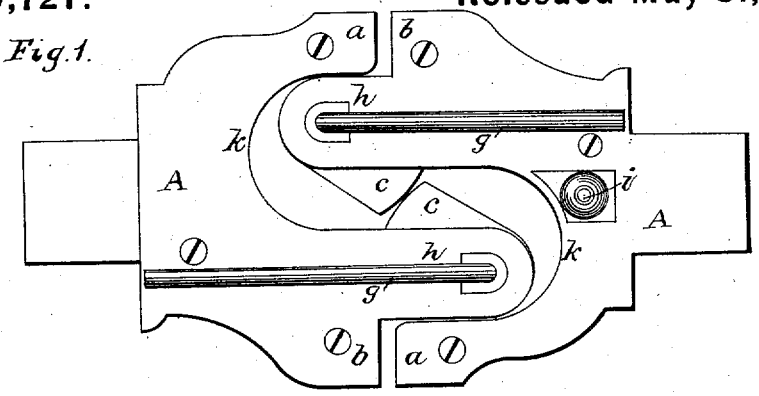
Fig. 4.
Fig. 2.
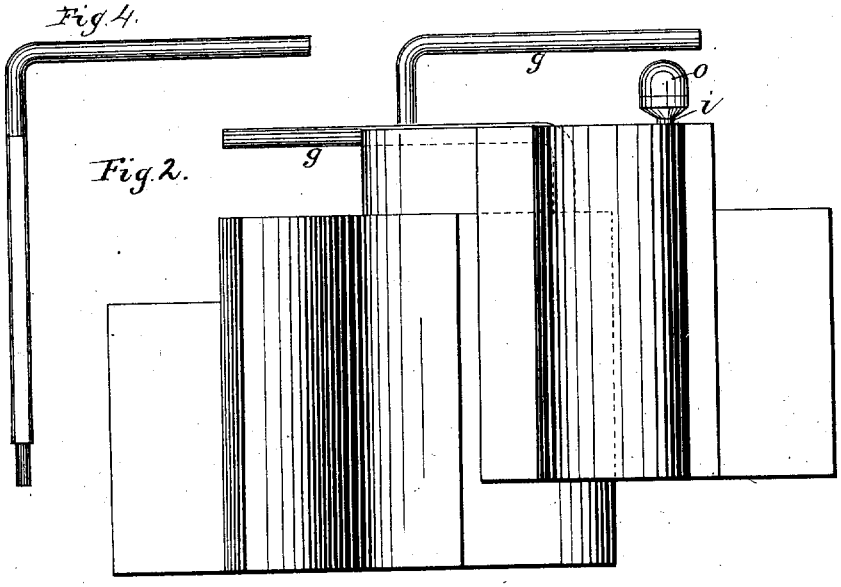
Fig. 3.
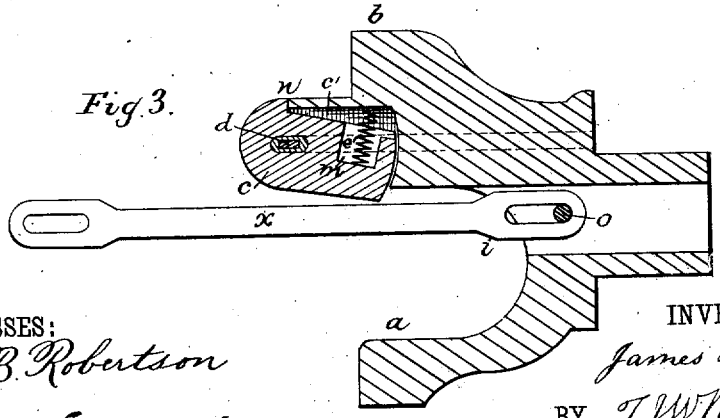
WITNESSES:
A. B. Robertson
Wm Turner
INVENTOR:
James H. Hills
BY T. J. W. Robertson
ATTORNEY

UNITED STATES PATENT OFFICE.

JAMES H. HILLS, OF BURLINGTON, VERMONT, ASSIGNOR, BY MESNE ASSIGNMENTS, OF PART INTEREST TO S. A. BOWERS, E. R. HARD, C. H. BLODGETT, AND D. G. REED, ALL OF SAME PLACE, G. S. MOULTON AND JUSTIN MOULTON, BOTH OF WEST RANDOLPH, VERMONT, AND GEORGE H. BISSEL, OF NEW YORK, N. Y.

CAR-COUPLING.

SPECIFICATION forming part of Reissued Letters Patent No. 9,727, dated May 31, 1881.

Original No. 203,912, dated May 21, 1878. Application for reissue filed April 1, 1881.

*To all whom it may concern:*

Be it known that I, JAMES H. HILLS, of Burlington, in the county of Chittenden and State of Vermont, have invented certain new and useful Improvements in Car-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to that class of automatic couplings in which two draw-heads of similar form are used; and it consists in the peculiar construction and arrangement of parts, hereinafter more fully described, and then pointed out in the claims.

The object of my improvement is to render draw-heads more effective and reliable, and avoid all danger in coupling and uncoupling cars.

The device is simple, and has no parts that are liable to get out of order, and can be made at a cheap price, and is adapted to all sorts of cars, and even those having the usual draw-heads. It is particularly effective where cars are to be coupled when the draw-head of one is higher than the other, as with my device the difference in height does not affect the easy, ready, and automatic coupling of such. Being self-acting in its operation it does not demand that great exposure of life and limb which belongs to the use of couplers not automatic.

In the drawings, Figure 1 is a plan view. Fig. 2 is a side view. Fig. 3 is a longitudinal section through one of the draw-heads. Fig. 4 shows a detached view of a lever and pivot. Similar letters of reference indicate corresponding parts.

A A are the two draw-heads, constructed substantially alike, each having a projecting arm, *h*, and bumper-heads, *a b*, with a cavity, *k*, between the parts *a* and *h*. In each of the arms *h* is pivoted a tumbler, *c*, resting in its normal position in a cavity, *c'*, and in this cavity a spring, *e*, is arranged, one end resting against the arm *h*, and the other in a recess, *n*, in the tumbler.

The purpose of the spring is to keep the tumbler out of the cavity *c'*, and the distance thereof is limited by a shoulder, *n*, on said tumbler striking against the arm *h*. As the draw-heads impinge the dogs *c* are driven inward, compressing spring *e* into recess *m*, which prevents said spring from being broken, and, after the faces pass the springs, throw the dogs out. As soon as traction is applied the faces bear against each other, and the shoulders *n* catch against the edges of the cavities, and thereby secure the intimate and strong locking of the dogs, and owing to the peculiar construction, proportion, and arrangement of the parts, the dogs hold the coupling fast without other locking devices. The greater the strain on the coupling the faster the dogs hold, as the inner side of the bumper head or arm *a* forms a guard that prevents the separation of the coupling.

Levers *g* or other suitable devices are connected to the tumblers at their pivotal point, or at other suitable place, to operate the tumblers against the springs *e*, in order to uncouple the draw-heads or cars. The tumblers, when the heads come together, yield until they pass each other, when the springs cause them to interlock instantly, as shown in Fig. 1, in which position the draw-heads cannot be separated, save by the turning of one of the levers, which draws the tumbler into its socket, thus permitting the heads to draw apart.

There is a space left between the arms *h* to permit a rocking movement, and the form thereof may be varied, if desired.

The arms *h* may serve as the bumpers in some cases, but I prefer the form substantially as shown.

The tendency of the draft is to draw the tumblers still more intimately together, and all liability of the cars becoming detached is avoided, as the strength of the jaws is greatest at the point of greatest strain.

The dog or tumbler *c* is shown as having an elongated hole through it to receive the pin *d*, which is bent at an angle to form the lever *g*. The pin has a flattened portion to fit the hole in the dog, and round portions above and below said flattened portion to fit round holes in the top and bottom of the arm *h*, whereby the dog may be turned easily; but other means of turning it may be adopted.

The acting faces of both dogs are curved to correspond with a circle of which the pivot is the center, whereby the dogs may be readily retracted for uncoupling the cars, if desired, even when there is great strain on the coupling.

By extending the draw-heads vertically, as shown in Fig. 2, they are adapted for cars of different heights, as a small bite of the tumblers is sufficient for the purpose of draft.

In operation the arms *h*, whose respective faces have the same angle of inclination, and correspond in all respects to each other, are so designed that when the draw-heads impinge in the act of coupling the arm of each coupler enters into the recess between the jaws of the opposing draw-heads, by which it is held, thus pressing the corresponding faces of their tumblers *c* against each other until they pass their respective points of contact, when, being mutually relieved from pressure, the tumblers spring forward into place.

By this simple arrangement the draw-heads will always couple with each other under all circumstances. Should they be required to couple with draw-bars provided only with the ordinary link, a hole, *i*, to receive the coupling-pin, is passed through the draw-heads, near the inner extremity of the concavity *k*. A horizontal slot is made in the head to receive the end of the link, through which the pin *o* may pass.

The link which I prefer to use is constructed with slotted ends, as seen in Fig. 3, (marked *x*,) in order to avoid the play incident to the link ordinarily employed.

What I claim as new is—

1. A coupling consisting of two bifurcated draw-heads of substantially similar form, one of the arms of each draw-head having a dog pivoted near its outer end, the other arm forming a guard, leaving a deep recess between the two arms, said arms, dogs, and recess being constructed, proportioned, and arranged substantially as described, whereby the dogs hold the draw-heads in locked position without other locking devices, as set forth.

2. A coupling consisting of two draw-heads, each draw-head having two fixed arms, one of said arms acting as a guard, and the other arm having a dog pivoted near its front, and constructed to move in one direction to allow the arm carrying the dog to pass between the two arms of the opposite draw-head, and then move in the opposite direction to hold the two draw-heads in a locked position, substantially as described.

3. A coupling consisting of two bifurcated draw-heads of substantially similar form, one of the arms of each draw-head having a pivoted dog adapted to yield when the arm carrying it is passing between the arms of the opposite draw-head and then spring out and hold the two draw-heads in locked position without a separate locking device, substantially as described.

4. A coupling consisting of two bifurcated draw-heads, one of the arms of each draw-head having a dog pivoted near its outer end, which dog has its acting face curved to correspond with a circle of which the pivot of the dog is the center, whereby either or both dogs may be readily retracted when in contact, substantially as described.

5. The bifurcated draw-head A, having the fixed arm *a* to act as a guard, and the arm *h*, carrying the pivoted dog *c*, in combination with the said pivoted dog *c* and spring *e*, substantially as and for the purpose specified.

6. The bifurcated draw-head A, in combination with the recessed and spring-acted dog *c*, substantially as shown.

7. The bifurcated draw-head A and spring *e*, in combination with the dog *c*, having shoulder *n* and recess *m*, substantially as described.

In testimony that I claim the foregoing I have hereunto set my hand this 19th day of March, 1881.

JAMES H. HILLS.

Witnesses:
ELLA T. HILLS,
S. A. BOWERS.